United States Patent [19]

Rauscher

[11] Patent Number: 4,856,095
[45] Date of Patent: Aug. 8, 1989

[54] OPFET DEMODULATOR-DOWNCONVERTER FOR DETECTING MICROWAVE MODULATED OPTICAL SIGNALS

[75] Inventor: Christen Rauscher, Alexandria, Va.

[73] Assignee: The United States of America as represented by the Secretary of the Navy, Washington, D.C.

[21] Appl. No.: 54,976

[22] Filed: May 28, 1987

[51] Int. Cl.$^4$ .............................................. H04B 9/00
[52] U.S. Cl. .................................. 455/619; 329/144; 329/179; 330/59; 331/116 FE
[58] Field of Search ............... 455/606, 607, 612, 617, 455/619; 370/3; 329/144, 153; 330/59, 308; 331/116 FE, 117 FE; 250/214 AG

[56] References Cited

U.S. PATENT DOCUMENTS 3,972,004  7/1976  Libs ..................................... 330/59
4,503,403  3/1985  Taylor et al. .................. 331/117 FF
4,631,500  12/1986  Rauscher ...................... 331/117 FE

OTHER PUBLICATIONS

Large-Signal Technique for Designing Single-Frequency and Voltage-Controlled GaAs FET Oscillators, by Christen Rauscher, IEEE Transactions on Microwave Theory and Techniques, vol. MTT-29, No. 4, Apr. 1981.
High-Frequency Doubler Operations of GaAs Field--Effect Transisters, by Christen Rauscher, IEEE Transactions on Microwave Theory and Techniques, vol. MTT-31, No. 6, Jun. 1983.
Microwave Characteristics of an Optically Controlled GaAs MESFET, by Hideki Mizuno, IEEE Transactions on Microwave Theory and Techniques, vol. MTT-31, No. 7, Jul. 1983.
Efficient Simple Optical Heterodyne Receiver; DC to 80 GHz, by D. K. Donald et al., presented at 1985 SPIE Conference, Washington, DC.
The OPFET: A New High Speed Optical Detector, by J. C. Gammel et al., in Proceedings of the IEDM, 1978, pp. 120-123.

Primary Examiner—Robert L. Griffin
Assistant Examiner—Leslie Van Beek
Attorney, Agent, or Firm—Thomas E. McDonnell; Peter T. Rutkowski; Andrew M. Lesniak

[57] ABSTRACT

A field-effect transistor performs four functions, namely signal demodulation, generation of a local oscillator signal, generation of harmonics of this local oscillator signal through frequency multiplication, and mixing of the demodulated signal with either the local oscillator signal or one of its harmonics to produce a signal at a lower intermediate frequency; the field-effect transistor being the key element in a demodulator-downconversion circuit.

4 Claims, 3 Drawing Sheets

OPFET DEMODULATOR-DONWCONVERTER FOR DETECTING MICROWAVE MODULATED OPTICAL SIGNALS

BACKGROUND OF THE INVENTION

The invention relates to a novel optical field-effect transistor optical signal demodulator and signal frequency downconverter and, more particularly, relates to a novel demodulator-downconverter for recovering information from a microwave modulated optical carrier signal.

Interest in developing new techniques for demodulating microwave modulated optical carrier signals has been stimulated in recent years by advances made in techniques used to impose radio frequency (RF) modulation on optical carrier signals. For example, photodetector diodes and transistors have been used to demodulate radio frequency (RF) modulated optical signals. Light intensity sensitive field-effect transistors may have been used for this purpose.

Light intensity sensitive field-effect transistors shall be referred to hereinafter as OPFETS. Gallium arsenide (GaAs) field-effect transistors (FETs), Indium Phosphide (InP) field-effect transistors (FETs), and high electron mobility field-effect transistors (FETs) are light sensitive, hence, are OPFETS by nature but are often not used as OPFETS. Optical control of GaAs FETs used as OPFETS is known and is a technique whereby optical energy in the form of incident light influences device characteristics (permitting rf-modulated light signals to induce changes in drain-source currents flowing through a GaAs FET). However, OPFETS have not been used to their full potential.

Reported techniques for utilizing GaAs FETs to perform optical signal demodulation have not heretofore capitalized on innate OPFET gain characteristics that can be employed for local oscillator(LO) signal generation, nor have such techniques capitalized on OPFET nonlinearities for use in LO frequency multiplication and downconversion processes.

Accordingly it is desired to utilize a light-intensity sensitive FET, or OPFET (such as a GaAs FET) first, to, demodulate microwave modulated optical signals and, second, to simultaneously down-convert such signals to a lower intermediate frequency (IF) band.

SUMMARY OF THE INVENTION

An object of the invention is to demodulate an RF-modulated optical carrier signal to detect the RF modulation and then downconvert the RF modulation signal from its own frequency to a lower or intermediate frequency (IF) for further signal processing, such as signal amplification.

Another object of the invention is to provide a novel OPFET demodulator and frequency downconverter using as OPFET a planar microwave FET.

Another object of the invention is to provide a novel OPFET demodulator and frequency downconverter for processing microwave modulated optical signals to extract an information signal borne on an optical carrier.

These and other objects and advantages of the invention are provided by a novel heterodyne circuit which has one optical field-effect transistor (OPFET) performing four simultaneous functions: demodulation, local oscillation, frequency multiplication, and mixing for downconversion purposes. The use of a single OPFET to perform the fourfold function of demodulating the optical carrier, generating the local oscillator signal, generating harmonics of the LO signal, and down-converting the modulation signal to a lower IF band affords a circuit of great economy and efficiency.

The invention provides a heterodyne circuit that includes a microwave field-effect transistor, responsive to optical stimulation (i.e. an OPFET), feedback means for routing a feedback signal of frequency $f_{loc}$ from the OPFET drain-source port to the OPFET gate-source port, and biasing means coupled to the OPFET ports to cause the OPFET to exhibit gain as well as nonlinear transconductance between the ports while harmonic frequencies n $f_{loc}$ of the frequency $f_{loc}$ are generated within the OPFET. In the expression n $f_{loc}$, n is an integer. Signal information of frequency $f_1$, detected by the OPFET, once separated from an optical carrier signal of specified wavelength (e.g. Lambda$_1$) mixes in the OPFET with a feedback signal of frequency $f_{loc}$ or a harmonic thereof to produce a downconverted signal of frequency $f_o$, with $f_o$ equal to the difference between n $f_{loc}$ and $f_1$.

BRIEF DESCRIPTION OF THE DRAWINGS

The invention and its advantages may be clearly understood by reference to the following detailed description and the accompanying drawings, wherein.

DESCRIPTION OF THE PREFERRED EMBODIMENT

Figure 1:
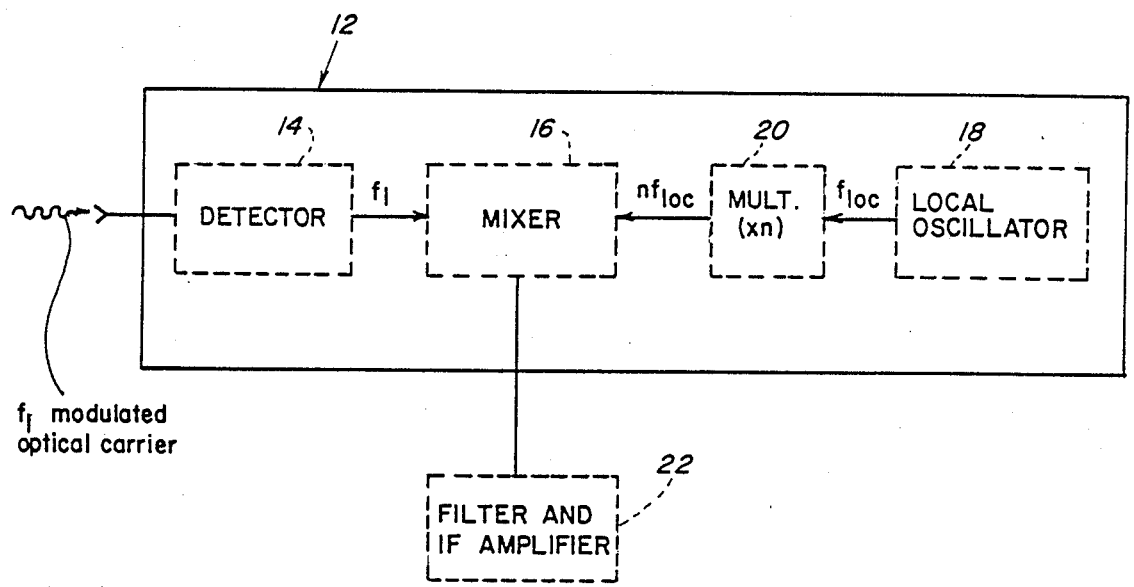
FIG. 1 is a block diagram indicating the general nature of the invention.

FIG. 1 includes a block diagram of a circuit 12 that performs demodulation-downconversion. A detector 14, a mixer 16, a local oscillator 18, and frequency multiplier 20 are four components of circuit 12. They are shown in FIG. 1 as four separate and distinct components but they, in actuality, are all combined together in a light sensitive field-effect transistor (shown in FIGS. 3–5) forming an active nonlinear device utilized in accordance with the invention. Detector 14 serves the dual purpose of separating an information signal of a designated frequency $f_1$ from an optical carrier signal of wavelength $\lambda_1$, and forwarding the detected information signal to mixer 16. Mixer 16 serves the purpose of combining the signal of frequency $f_1$ with another signal of frequency n $f_{loc}$ supplied by local oscillator 18 and frequency multiplier 20. An IF filter amplifier circuit 22 coupled to the output of circuit 12 serves the dual purpose of filtering extraneous signal frequencies from the output of circuit 12 and amplifying only a signal of frequency $f_o$ forwarded by circuit 12 to circuit 22. Circuit 22 is not an essential part of the invention, hence, is shown by a box outlined by dashed lines, in contrast to the circuit 12 shown by a box outlined by a solid line.

Figure 2:
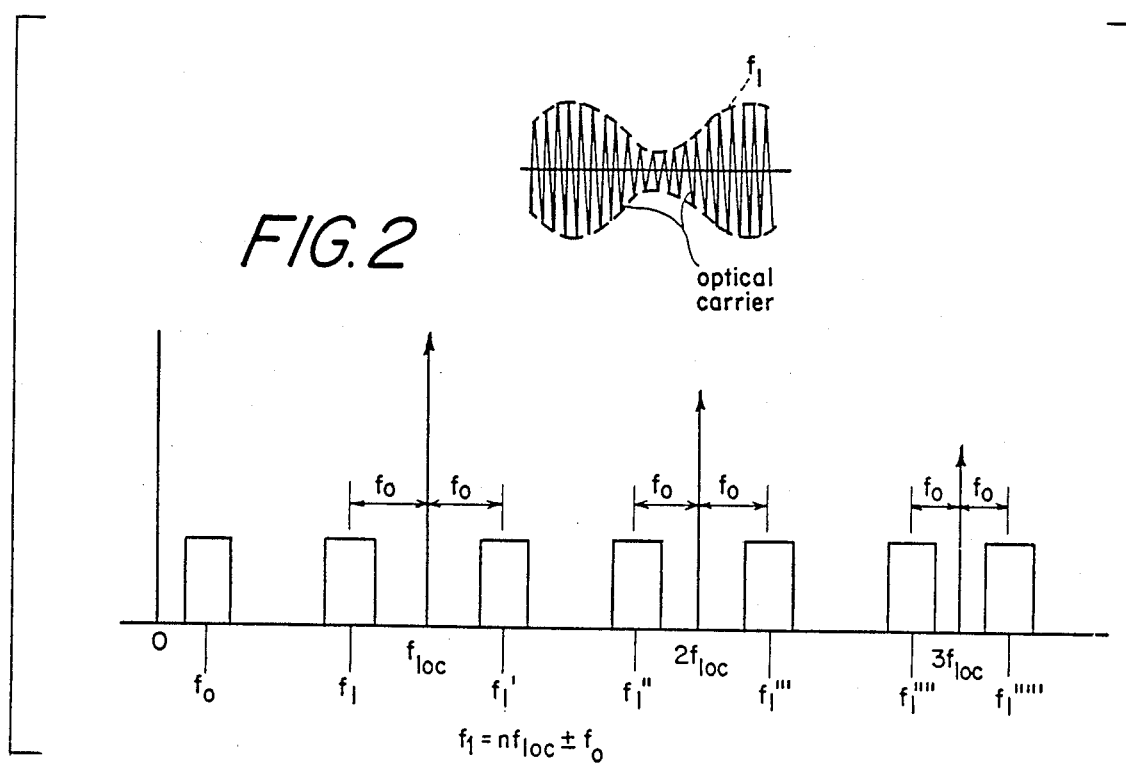
FIG. 2 illustrates the nature of a heterodyne scheme implemented by the invention.

FIG. 2 is a diagram showing signals of various frequencies in a frequency spectrum. The diagram represents the frequency $f_{loc}$ of a local oscillation signal from local oscillator 18, the frequency 2 $f_{loc}$ of the first harmonic of the frequency $f_{loc}$, the frequency 3 $f_{loc}$ of the second harmonic of the frequency $f_{loc}$, and information signal frequency bands yielding IF output signals centered around $f_o$. Also shown in the diagram is an input signal that is an AM optical carrier having an information signal $f_1$ borne thereon. In order to yield an output response that lies within the designated IF band centered around $f_o$, frequencies of the information signal $f_1$ derived from detector 14 must fall within the discrete reception bands centered around $f_1 = n\ f_{loc} \pm f_o$, $n = 1,2,3$, ... as indicated in FIG. 2. The particular choice will depend on the application. FIG. 2 relates to a heterodyne circuit, one wherein two alternating currents that differ in frequency are mixed in a nonlinear device to produce two new frequencies, corresponding to the sum and difference of two frequencies utilized. Only the difference frequency is commonly used in a super heterodyne receiver, where it serves as the input to an intermediate-frequency amplifier. The heterodyne principle permits conversion of a wide range of different input frequencies to a predetermined, lower intermediate frequency value that can be more efficiently amplified.

Figure 3:
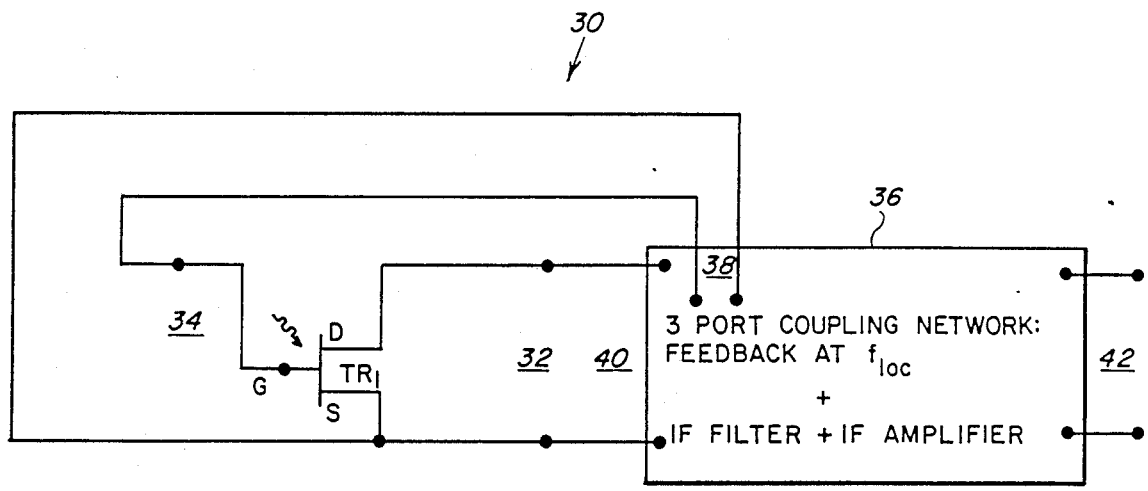
FIG. 3 shows an OPFET in a circuit embodying the invention.

FIG. 3 is a circuit diagram showing a demodulation-downconverter-amplifier circuit 30 embodying the invention. Circuit 30 comprises an optically sensitive field-effect transistor, or OPFET, identified as $TR_1$, having a drain D, a source S, a gate G, and a channel connecting drain D and source S. Drain D and Source S are connected to a drain-source port 32. Likewise, gate G and source S are connected to a gate-source port 34. A three-port network 36 comprising a feedback and impedance matching circuit, an IF filter, and IF amplifier, interconnects with OPFET $TR_1$. Network 36 has ports 38, 40 and 42. Network port 38 couples to OPFET gate-source port 34 to establish local oscillation (LO) at frequency $f_{loc}$ by feeding signal at $f_{loc}$ from $TR_1$ output port 32 back to $TR_1$ input port 34. Network port 40 couples to OPFET drain-source port 32 to accept a combination signal of component frequencies $f_{loc}$, 2 $f_{loc}$, 3 $f_{loc}$, ... n $f_{loc}$, (where n is an integer), $f_1$ and $f_o$. Network port 42 of provides an output signal of frequency $f_o$. Of foremost importance in circuit 30 is OPFET TR1 which serves a fourfold function in a manner to be described with reference to FIGS. 4 and 5.

Figure 4:
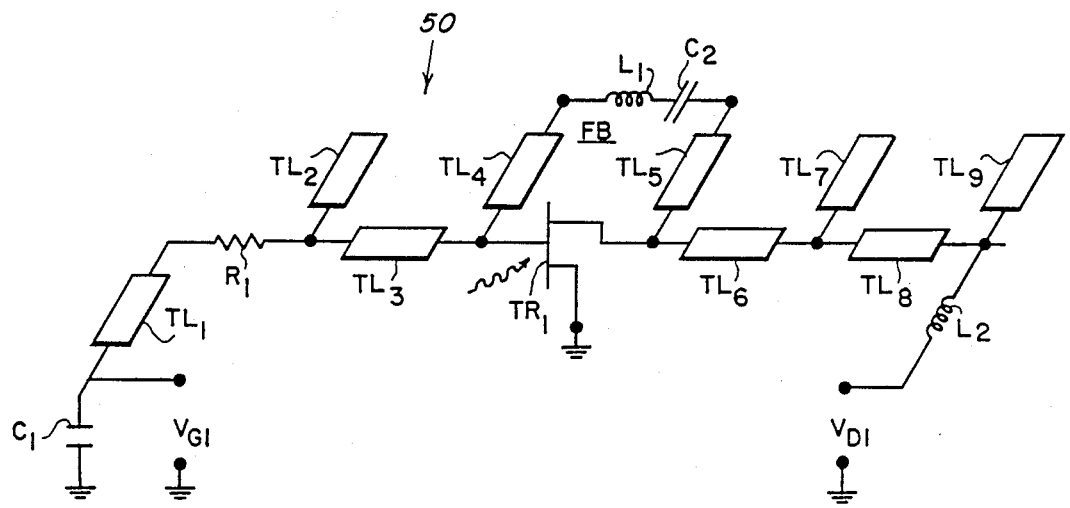
FIG. 4 is a circuit diagram of a novel optical field-effect transistor demodulator-downconverter featuring a quadruple function OPFET in a preferred embodiment of the invention.
Figure 5:
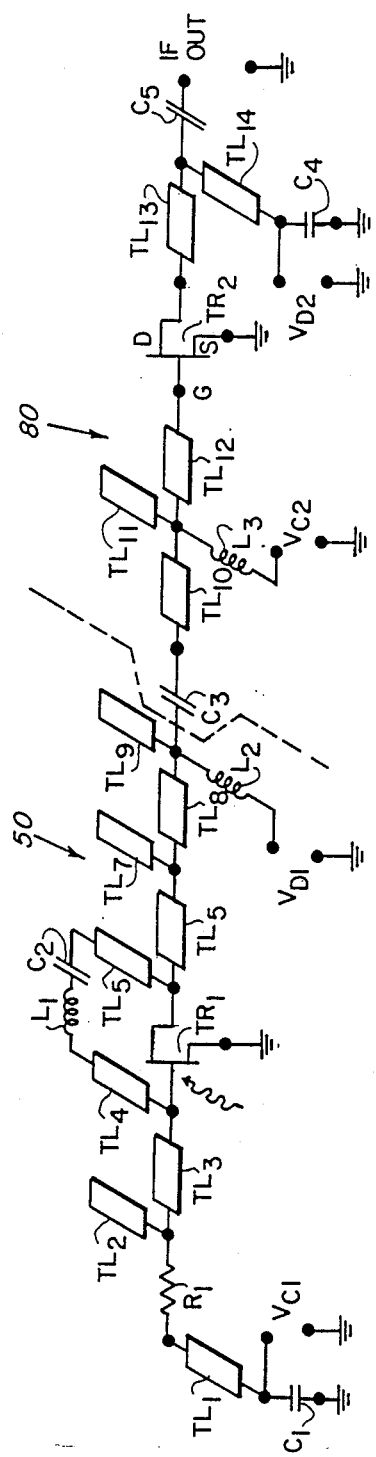
FIG. 5 is a circuit diagram of the novel OPFET demodulator-downconverter of FIG. 4, combined with an intermediate frequency (IF) amplifier stage following the OPFET demodulator-downconverter.

Circuit components shown by FIGS. 4 and 5 includes: a GaAs OPFET $TR_1$, a GaAs FET $TR_2$, capacitors $C_1$–$C_5$, inductors $L_1$–$L_3$, and transmission lines $TL_1$–$T_{14}$. Bias voltage levels $V_{G1}$ and $V_{D1}$ are maintained in the FIG. 4. Bias voltage levels $V_{G1}$, $V_{D1}$, $V_{G2}$, and $V_{D2}$ are maintained in the FIG. 5 circuit. $V_{G1}$ is the bias voltage for the gate of $TR_1$, $VD_1$ is the bias voltage for the drain of $TR_1$. $V_{G2}$ is the bias voltage for the gate of $TR_2$, and $VD_2$ is the bias voltage for the drain of $TR_2$.

Referring now to FIG. 4, the shown circuit 50 is a transistor demodulator-downconverter that receives and processes microwave modulated optical signals. Circuit 50 includes the aforementioned light-sensitive, single-gate, gallium arsenide (GaAs) field-effect transistor (FET) $TR_1$ (an OPFET). $TR_1$ receives an input optical signal, shown by a wavy arrow in FIGS. 1 and 3-5, incident on the gatechannel region between TR's drain D and source S.

$TR_1$ has drain, source, gate, and channel regions. The effective channel length under the gate electrode is a quarter-micron (micrometer) or less to accommodate microwave frequencies encountered in a particular application. The gate electrode forms a Schottky barrier junction with the channel region. The source electrode of OPFET $TR_1$ couples source S to ground, as shown. The gate electrode of OPFET $TR_1$ couples gate G to bias voltage source $V_{G1}$ to bypass capacitor $C_1$ via transmission line $TL_3$, resistor $R_1$, and transmission line $TL_1$. $TL_1$, $R_1$ and $TL_3$ are series connected to couple capacitor $C_1$ and $V_{G1}$ to the gate electrode. $TL_2$ and $TL_3$ connects to a circuit junction point 60. Drain electrode 62 of FET $TR_1$ couples to bias voltage $V_{D1}$ via $TL_6$, $TL_8$ and $L_2$. Feedback network FB couples the drain electrode to the gate electrode of $TR_1$. Network FB includes transmission line $TL_4$, inductor $L_1$, capacitor $C_2$ and transmission line $TL_5$ serially connected between the gate electrode and the drain electrode of $TR_1$ Line $TL_7$ is connected to a circuit point where $TL_7$ connects with lines $T_6$ and $TL_8$. Line $TL_9$ is connected to a circuit point where line $TL_9$ connects to line $TL_8$ and inductor $L_2$.

Referring now to FIG. 5, one can see that the output signal from circuit 50 feeds into FET $TR_2$ via capacitor $C_3$ and lines $TL_{10}$ and $TL_{12}$. $TR_2$ thus amplifies an input signal forwarded by the output of circuit 50. FET $TR_2$ though light sensitive is not referred to herein as an OPFET because no optical signal is ever applied to $TR_2$. FET $TR_2$, an intermediate-frequency amplifier, couples to transmission lines $TL_{10}$ and $TL_{12}$. The gate electrode of FET $TR_2$ receives a signal forwarded from a circuit point. Bias voltage $V_{G2}$ is applied to the gate electrode of $TR_2$ via inductor $L_3$ and line $TL_{12}$. Transmission line $TL_{11}$ connects to line $TL_{10}$ at another circuit point and line $TL_{12}$ connects the point to the gate electrode of $TR_2$. The source electrode of FET $TR_2$ is coupled to ground. The drain electrode of FET $TR_2$ is to coupled to transmission line $TL_{13}$ and to output capacitor $C_5$. Transmission line $TL_{14}$ and capacitor $C_4$ are serially connected and are connected to each other at another circuit point therebetween. Bias voltage $V_{D2}$ couples to the drain electrode of $TR_2$ via $TL_{14}$ and $TL_{13}$.

The GaAs FET demodulator-downconvertor 50 of FIG. 4, unaugmented by the above-described IF amplifier stage of FIG. 5 is comprised of transmission lines $TL_1$ through $TL_7$, resistor $R_l$, capacitors $C_1$ and $C_2$, inductors $L_1$ and $L_2$, and the essential GaAs FET $TR_1$. Other components shown only in FIG. 5 are associated with the IF amplifier stage following the demodulator-downconverter stage. A dashed line (not labelled) shown in FIG. 5 indicates that circuit 50 feeds into a subsequent circuit 80 that includes $TR_2$ as its main component.

Circuit components values are given in TABLE 1 below. The values have been carefully selected in implementing one exemplary embodiment of the invention.

TABLE 1

Transmission lines of electrical length $\theta$ and characteristic impedance $Z_o$.

| $TL_1$: | $Z_o = 70\Omega$ | $\theta = 60°$ at 31 GHz | $TL_8$: | $Z_o = 95\Omega$ | $\theta = 20°$ at 4 GHz |

TABLE 1-continued

Transmission lines of electrical length $\theta$ and characteristic impedance $Z_o$.

| | | | | | |
|---|---|---|---|---|---|
| TL$_2$: | $Z_o = 74\Omega$ $\theta = 90°$ at 31 GHz | | TL$_9$: | $Z_o = 70\Omega$ | $\theta = 36°$ at 4 GHz |
| TL$_3$: | $Z_o = 74\Omega$ $\theta = 32°$ at 31 GHz | | TL$_{10}$: | $Z_o = 105\Omega$ | $\theta = 32°$ at 4 GHz |
| TL$_4$: | $Z_o = 105\Omega$ $\theta = 20°$ at 31 GHz | | TL$_{11}$: | $Z_o = 100\Omega$ | $\theta = 15°$ at 4 GHz |
| TL$_5$: | $Z_o = 95\Omega$ $\theta = 25°$ at 31 GHz | | TL$_{12}$: | $Z_o = 105\Omega$ | $\theta = 15°$ at 4 GHz |
| TL$_6$: | $Z_o = 105\Omega$ $\theta = 90°$ at 31 GHz | | TL$_{13}$: | $Z_o = 95\Omega$ | $\theta = 66°$ at 4 GHz |
| TL$_7$: | $Z_o = 95\Omega$ $\theta = 90°$ at 31 GHz | | TL$_{14}$: | $Z_o = 105\Omega$ | $\theta = 80°$ at 4 GHz |

Lumped elements:

| | | |
|---|---|---|
| $R_1 = 100\Omega$ | $L_3 = 15$ nH | $C_3 = 20$ pF |
| $L_1 = .4$ nH | $C_1 = 10$ pF | $C_4 = 20$ pF |
| $L_2 = 15$ nH | $C_2 = 3$ pF | $C_5 = 20$ pF |

Transistors:

TR$_1$: Avantek M121 GaAs FET
TR$_2$: Avantek M126 GaAs FET
TR$_1$ and TR$_2$ were provided by Avantek of Santa Clara, California Symbols
$Z_o$ = characteristic impedance
$\theta$ = phase shift
GHz = Gigahertz Demodulator-downconverter circuit 50 has its component values chosen to impleent a $\pi$-type 31 GHz oscillator, providing a local oscillator signal. Feedback at 31 GHz to sustain the oscillation is established with the help of L$_1$, C$_2$, TL$_4$, and TL$_5$, with other circuit elements furnishing appropriate impedance matching conditions for the input and the output of TR$_1$. Resistor R$_1$, in conjunction with TL$_1$ and C$_1$, serves to suppress any potential parasitic oscillations that might occur along with the principal 31 GHz oscillation. The circuit point between TL$_2$ and TL$_3$ is a virtual ground point at 31 GHz (because TL$_2$ is one quarter wavelength long at 31 GHz), hence the R$_1$—TL—C$_1$ trio does not interfere with the principal oscillation. Transmission line TL$_7$ is also a quarter wavelength long at 31 GHz, providing a virtual short circuit to ground at 31 GHz at the circuit point between TL$_6$ and TL$_8$, and preventing the local oscillator signal from propagating beyond this point. The demodulated RF signal then mixes with the 31 GHz local oscillator signal or one of its harmonics in FET TR$_1$, producing a lower intermediate frequency (IF) signal which is then applied to the input of the following IF booster amplifier TR$_2$. The mixing takes place with the help of the FET nonlinearities, representing the basis for the downconversion process. Gate and drain bias voltages, V$_{G1}$ and V$_{D1}$, are applied to TR$_1$, as indicated. The two main nonlinearities are the transconductance from gate-source to drain-source port, and the drain-source conductance nonlinearity.

The RF modulated light beam—indicated in the drawing figures-is focused onto the surface of TR$_1$, through a small hole in the lid of a metal case housing the circuit, and is then demodulated within FET TR$_1$ with the help of light-sensitive transistor characteristics, as referred to earlier, prior to down-conversion.

The IF amplifier TR$_2$ circuit 80 is designed for use with circuit 50. The earlier mentioned circuit elements TL$_8$ through TL$_{12}$, including DC blocking capacitor C$_3$, are designed to provide a broadband impedance match between the demodulator-downconverter output and the input of TR$_2$ at the IF frequencies. Similarly, TL$_{13}$ and TL$_{14}$ serve to match the capacitive output of TR$_2$ to a 50 ohm load, with capacitor C$_5$ serving as a DC blocking capacitor. Gate and drain bias voltages, V$_{G2}$ and V$_{D2}$, are applied to TR$_2$ as indicated. (L$_2$ and L$_3$ are choke coils to prevent the IF signal from being dissipated in the DC power supplies, because V$_{D1}$ and V$_{G2}$ are introduced at points which are not IF virtual grounds.)

In summary, the invention provides a circuit for demodulating a microwave modulated optical signal by converting the signal from optical to electrical form and for shifting the resultant demodulated electrical signal to a lower frequency before routing the derived electrical signal to a circuit output port. The provided circuit comprises a nonlinear OPFET for converting signal from optical to electrical form. The OPFET may, but need not be a single-gate, three-electrode GaAs field-effect transistor. The OPFET is connected into a network of components forming a circuit having input and output ports. The OPFET exhibits a nonlinear transconductance characteristic from the input port to the output port as well as a nonlinear drain-source terminal conductance. The input port is adapted to receive microwave modulated optical signal of wavelength bearing an information signal of frequency f$_1$ (the envelope frequency of the amplitude modulation). The OPFET can, but need not, be configured as a common source OPFET. Biasing means for the OPFET are connected to all three OPFET electrodes to maintain the quiescent drain-source current near, but just short of current "pinch off" so that the OPFET exhibits nonlinear transconductance characteristic during operation as well as to maintain quiescent drain-source voltage near the "knees" of the drainsource current versus drain-source characteristics where drain-source conductance nonlinearities are most pronounced.

A feedback loop couples a feedback signal of frequency f$_{loc}$ from the output port of the OPFET to its input port to establish oscillation at frequency f$_{loc}$. The feedback signal is then frequency multiplied with the help of the nonlinear transconductance to produce harmonics at frequencies n f$_{loc}$. Either the fundamental frequency or one of the harmonics of the fundamental frequency then mixes with aforesaid demodulated electrical signal through the OPFET nonlinear transconductance and nonlinear output conductance characteristics to then produce the desired output electrical signal. The OPFET performs demodulation of a microwave modulated optical signal generation of the local oscillator signal, generation of harmonics thereof, and mixing of the demodulated electrical signal to produce a downconverted replica of the demodulated electrical signal, while relying on one transistor to perform all these functions.

The invention has application whenever RF signal information imposed on a light-wave carrier for optical transmission of the information (via fiber, for instance) is to be later extracted from the carrier after transmission and reception of the information carrying optical signal. The invention is applicable not only to conventional data and voice transmission systems, but also to systems where coherent microwave signals must be supplied to locations far apart and where cost and weight considerations make transmission via optical fiber more attractive than reliance on conventional microwave and millimeter waveguides of the kind utilized, for example, in shipboard phased array systems.

In the shown embodiment of the invention as described above, one single-gate three-electrode FET performs as an OPFET that performs the demodulation function (with the help of its light-sensitive RF (conductance) characteristics), and simultaneously performs the down-conversion function by (a) utilizing the OPFET RF gain properties to achieve oscillation at the desired local oscillator frequency, by (b) frequency multiplying the LO signal with the help of device non-linearities and by (c) utilizing device nonlinearities to provide signal mixing in the FET. The novel multifunctional use of the OPFET leads to a very compact and simple overall circuit.

The general circuit configuration described above with reference to FIG. 4 is that of an oscillator designed to generate the desired local oscillator signal needed in the down-conversion process. Obviously other configurations may be used, although the one shown is now a preferred configuration. Choice of a particular configuration for any particular application will depend on the actual frequencies involved and on practical considerations. An oscillator configuration other than the grounded-source configuration employed in the example can be used. Any oscillator configuration can be used, in principle, and there are many such variant configurations.

Obviously, numerous modifications and variations of the invention are possible in light of the above teachings. It is therefore to be understood that within the scope of the appended claims the invention may be practiced otherwise than as specifically described herein.

What is claimed and desired to be secured by Letters Patent of the United States is:

1. A Demodulator-Downconverter for demodulating a microwave-modualted optical carrier signal to separate a microwave signal of frequency $f_1$ from the optical carrier signal and to convert the signal frequency $f_1$ to a lower signal frequency $f_O$, comprising:

an OPFET responsive to a microwave-modulated optical signal carrying a microwave signal of frequency $f_1$ to demodulate said microwave-modulated optical signal;

the OPFET having a source, a drain, and a gate;

biasing means connected to the source, the drain, and the gate to bias the source, the drain, and the gate thereby causing the OPFET to simultaneously exhibit both nonlinear transconductance and non-linear drain-source conductance;

feadback means carrying a microwave signal of frequency $f_{loc}$ around the OPFET from the output port of the OPFET back to the input port of the OPFET while harmonics of this signal are generated in the OPFET because of the OPFET's nonlinear transconductance resulting from the bias applied to the source, the drain, and the gate;

said OPFET, through its nonlinear output conductance characteristics causes mixing of a microwave signal of frequency n $f_{loc}$, where n is a positive integer, with the microwave signal of frequency f1 after the latter has been separated from the optical carrier signal in the OPFET to produce a microwave signal of beat frequency $f_O$ according to the relation $f_1 = n\ f_{loc}$ plus or minus $f_O$ at the output of the Demodulator-Downconverter;

whereby the output port of the OPFET can be connected to a filter means for selecting the microwave signal of beat frequency $f_O$ from all beat frequency signals of frequency $f_O = n\ f_{loc}$ plus or minus $f_1$ where n = 1, 2, 3, . . .

2. The OPFET Deomdulator-Downconverter of claim 1 further comprising:

filter means connected to the output port of the OPFET to select the microwave signal of beat frequency $f_O$ from all eat frequency signals of frequencies $f_O = n\ f_{loc}$ plus or minus $f_1$ where n = 1, 2, 3, . . .

3. The OPFET Demodulator-Downconverter of claim 1 wherein the OPFET is a GaAs FET.

4. The OPFET Demodulator-Downconverter of claim 1 further comprising:

FET means coupled to the output port of the OPFET Demodulator-Downconverter to amplify the microwave signal of frequency $f_O$.

* * * * *